United States Patent [19]
Orwin

[11] 3,866,728
[45] Feb. 18, 1975

[54] OVERLOAD CLUTCH

[75] Inventor: Olaf John Barclay Orwin, Quinton, England

[73] Assignee: Gib Precision Limited, Cirencester, England

[22] Filed: May 24, 1973

[21] Appl. No.: 363,587

[30] Foreign Application Priority Data
May 26, 1972 Great Britain .................... 24852/72

[52] U.S. Cl. .............................................. 192/56 R
[51] Int. Cl. ............................................ F16d 43/20
[58] Field of Search .......... 192/56 R; 74/773; 64/29

[56] References Cited
UNITED STATES PATENTS

| | | | |
|---|---|---|---|
| 1,380,271 | 5/1921 | Thropp | 74/773 |
| 1,782,158 | 11/1930 | Wemp | 74/773 |
| 2,038,896 | 4/1936 | Fast | 192/56 R |
| 2,253,466 | 8/1941 | Grohn | 64/29 X |
| 2,372,123 | 3/1945 | Sadler | 74/773 |
| 3,211,262 | 10/1965 | Hoffstrom | 192/56 R X |
| 3,277,670 | 10/1966 | Bent | 192/56 R X |

Primary Examiner—Allan D. Herrmann
Attorney, Agent, or Firm—Kurt Kelman

[57] ABSTRACT

An overload clutch for transmitting a relatively high torque comprising a pair of rotatable members, one of the members carrying a number of torque limiters in planet fashion around its axis of rotation, the torque limiters being connected to male drive transmitting abutments which are maintained by the torque limiters in drive transmitting engagement with further, female, drive transmitting abutments carried by the other rotatable member. The female drive transmitting abutments are mounted for movement relative to the male drive transmitting abutments in a second path, different to the path for disconnecting the drive between the members, to permit the abutments to be re-engaged concurrently with resetting of the torque limiters after disengagement of the abutments on application of a torque to the clutch above a predetermined value.

21 Claims, 4 Drawing Figures

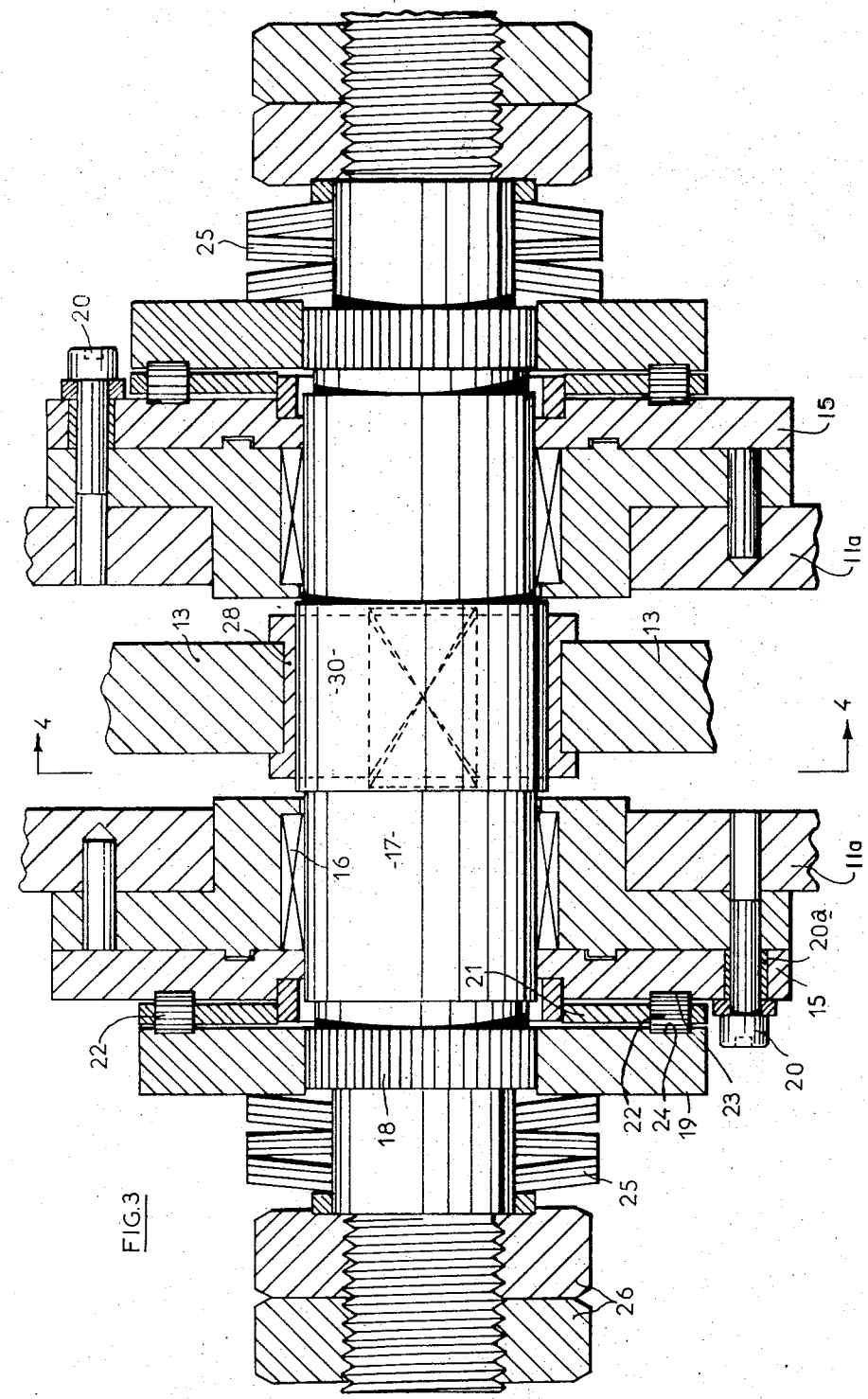

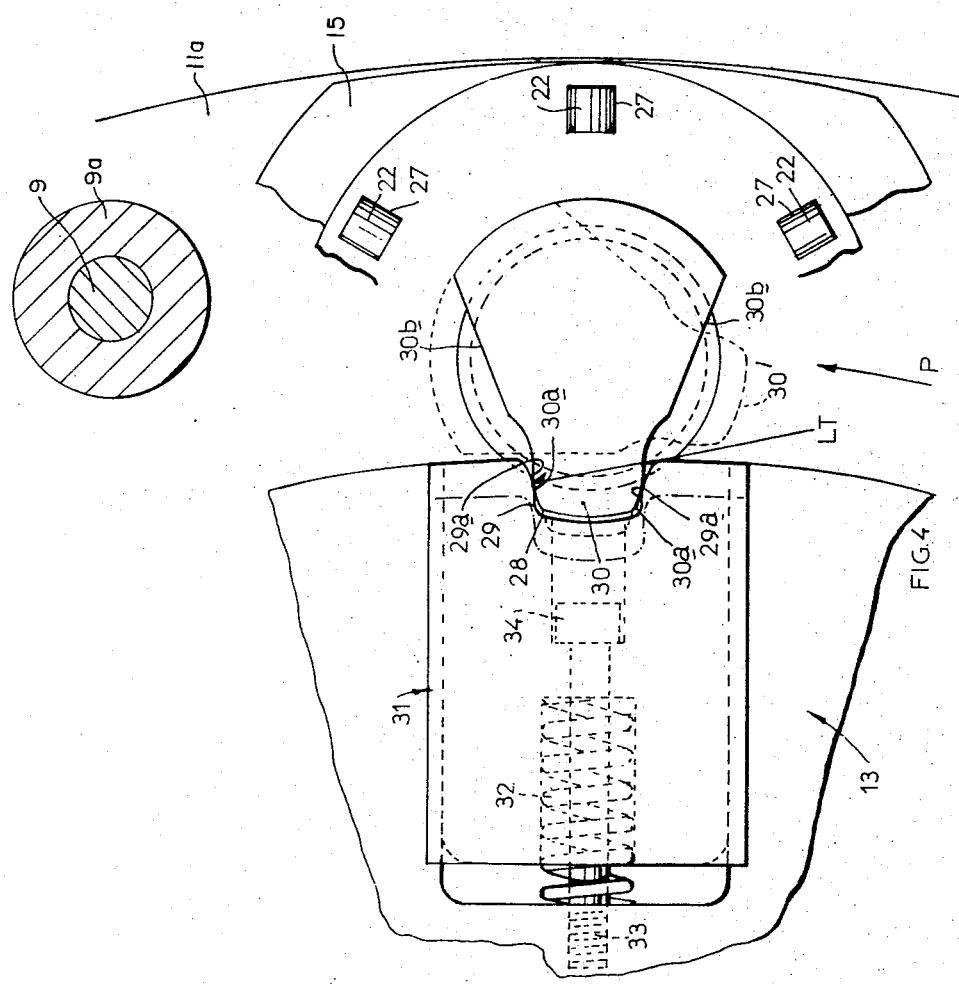

OVERLOAD CLUTCH

BACKGROUND OF THE INVENTION

1. Field of the Invention

This invention relates to an overload clutch for use in establishing a torque transmitting connection between a pair of rotatable members to transmit up to a predetermined amount of torque and which will disconnect the torque connection between the members when the torque exceeds said predetermined amount.

2. Description of the Prior Art

The invention is particularly concerned with such an overload clutch for use in transmitting a relatively high torque, for example, a torque lying in the range 500,000 lb.ins. up to 15,000,000 lb.ins. or even higher. There is a potential demand for overload clutches capable of reliably operating at such relatively high torque. Such potential demand exists in large size rolling mills where, in an endeavour to prevent severe damage to the drive of the mill, it is customary to incorporate one or more shear pin type torque limiters in the drive. Such a form of torque limiter operating at these very high torque is extremely unreliable and uncertain in operation. The shear stresses, particularly with the very rapidly changing torque loading which occurs in a large size mill, rapidly cause severe stres fatigue so that the shear pins are liable to fail unexpectedly at loadings well below the designed safe loadings, thus most expensively putting the mill out of action. Also, by reason of the time taken to replace the shear pins, the mill will be put out of operation for a relatively long period thus involving considerable expense.

Also by reasons of the unreliability of shear pins where these very high torques are involved, they are liable not to operate at all when the safe maximum torque is substantially exceeded, with consequent damage, often severe, to the mill drive, and loss of production time which may be very considerable if the damage is severe.

A most important characteristic of an overload clutch is that there is consistent reliability to disengage at a designed torque within a tolerance which is commonly as low as $\mp$ 2 percent or 3 percent.

In U.S. Pat. No. 2,038,898, there is proposed an overload clutch comprising a pair of rotatable members, disengageable drive means to transmit torque between said members, said drive means comprising a plurality of pairs of disengageable drive transmitting abutments and a plurality of torque limiters operative up to a predetermined torque to prevent disengagement of said drive transmitting abutments to enable transmission of torque between said members and operative above said predetermined torque to permit disengagement of said abutments to interrupt transmission of torque between said members.

In this proposed overload clutch there is no provision for rapid and convenient resetting of the torque limiters and re-engagement of the disengageable drive transmitting abutments when the torque transmitting connection between the rotatable members has been interrupted.

It is an important requirement of a commercially acceptable overload clutch that the clutch can be rapidly and conveniently reset. This is particularly the case in a hot rolling mill where any delay in resetting of the overload clutch will create the problems discussed hereinbefore in connection with the delay arising from the use of a shear pin type of torque limiter. Thus, in so far as the overload clutch of U.S. Pat. No. 2,038,896 does not have any means for rapid resetting, it suffers from the same disadvantages and creates the same problems as does a shear pin type of torque limiter as described hereinbefore.

In the overload clutch proposed in U.S. Pat. No. 2,038,896, all the pairs of disengageable drive transmitting abutments must be simultaneously re-engaged and it will be appreciated that to do this it is necessary to reset the torque limiters and at the same time re-engage the disengageable drive transmitting abutments. Thus, each quill shaft of the proposed clutch has to be rotated until its associated driving abutment is engaged with the driving abutment associated with the other rotatable member. There is no disclosure in the specification of how this is to be simultaneously achieved for all the pairs of abutments. In addition, it will be necessary to slacken off the nuts which tension the spring means, which biases the face cams into engagement, to permit rotation of each quill shaft to re-engage the drive transmitting abutments due to the high friction arising from the spring loading necessary to permit the proposed clutch to transmit a torque in the range under discussion.

A further important disadvantage of the overload clutch of U.S. Pat. No. 2,038,896 is that in this proposed overload clutch one abutment of each pair of drive transmitting abutments projects radially outwardly from a quill shaft which has, at opposite ends, face cams which are in operative relationship with further face cams on disc elements non-rotatably carried by one of the rotatable members. The face cams provide the torque limiter of the pair of drive transmitting abutments. The quill shaft and disc elements are carried in a pocket provided in said one rotatable member and are mounted on an axially extending rod received in an axial bore in the quill shaft and disc elements.

As a result of this, the proposed overload clutch suffers from the following disadvantages and problems.

The torque transmitted between the two rotatable members is transmitted from the one rotatable member to the drive transmitting abutment carried thereby as a result partly of engagement between the wall of the pocket and the external surface of the quill shaft and partly as a result of engagement between the wall of the pocket, the external surface of the disc elements, the bore of disc elements, the surface of the rod and the bore of the quill shaft.

Thus, when the torque to be transmitted between the rotatable elements is greater than the predetermined torque and the face cams are intended to permit rotation of the quill shaft to disengage the drive transmitting abutments rotation of the quill shaft is resisted due to frictional forces arising from the above described torque transmittal path.

That is to say, the engagement between the wall of the pocket and the external surface of the quill shaft and the engagement between the bore of the quill shaft and the rod creates frictional forces which resist rotation of the quill shaft whilst engagement between the external surface of the discs and the wall of the pocket and the bore of the discs and the rod causes frictional forces which resists axial movement of the discs in the direction to permit rotation of the quill shaft.

As a result, in use, the overload clutch proposed in U.S. Pat. No. 2,038,896 would be unsatisfactory as the torque at which torque transmittal would be interrupted would not be accurately predictable nor reproduceable due to the above described frictional forces which cannot be predetermined and which are not constant in service, thus, in this regard, the overload clutch proposed in U.S. Pat. No. 2,038,896 does not provide a solution to the problem discussed above in connection with a shear pin type torque limiter.

SUMMARY OF THE INVENTION

An object of the invention is to provide a new and improved overload clutch.

In order to overcome the problems inherent in the overload clutch proposed in U.S. Pat. No. 2,038,896 Applicants have provided in an overload clutch comprising a pair of rotatable members, disengageable drive means to transmit torque between said members, said drive means comprising a plurality of pairs of disengageable drive transmitting abutments and a plurality of torque limiters operative up to a predetermined torque to prevent disengagement of said drive transmitting abutments to enable transmissions of torque between said members and operative above said predetermined torque to permit disengagement of said abutments to interrupt transmission of torque between said members, the improvement wherein each torque limiter comprises a pair of clutch elements, means mounting one element of each pair for overrunning movement relative to the other when more than a predetermined torque is applied and means preventing such overrunning movement until such torque is exceeded, comprising a plurality of restraining members adapted for rolling movement and maintained in restraining engagement with the torque limiter clutch elements by loading means and in which the abutments of each pair of drive transmitting abutments are mounted for mutual relative movement in a first path on said overrunning movement to permit disengagement of the abutments and for relative movement in said first path and a second, different path, to permit resetting of the torque limiters and re-engagement of the abutment.

The rolling restraining members provide torque limiters having the characteristics that once the elements of the torque limiter have commenced their overrunning movement, the torque necessary to continue the overrunning movement, or to cause movement in the reverse direction to reset the torque limiters, is considerably less than the predetermined torque necessary to initiate the overrunning movement. Thus, when it is desired to reset the torque limiters the torque required to do this is relatively small and can be achieved manually. This is in contrast with the torque characteristics which would be encountered with the face cam type of torque limiter in the proposed overload clutch of U.S. Pat. No. 2,038,896 where a relatively high torque is required to cause continued overrunning movement or return movement to reset the torque limiter, particularly at the high spring loadings required to transmit torque in the range under discussion.

By mounting the abutments for mutual relative movement in a second different path the abutments of each pair of disengageable drive transmitting abutments are rendered self-accommodating, that is to say, during the resetting of the torque limiters and re-engagement of the abutments the abutments are permitted to accept each other and thus re-engage simultaneously with resetting of the torque limiters.

This permits of rotation of the torque limiters to a position immediately prior to their reset position individually so that the drive transmitting abutments are in position for re-engagement and then, as a result of a relative movement between the rotatable members, the torque limiters are simultaneously moved to their reset position and the abutments re-engaged.

Alternatively, the rotatable members may be set in their normal torque transmitting relationship and then the torque limiters may be rotated independently and separately completely to re-engage the drive transmitting abutments and to reset the torque limiters.

In contrast, in the proposed overload clutch of U.S. Pat. No. 2,038,896, no such means for rendering the abutments of self-accepting is provided and it would be either impossible, or at least very difficult, time consuming and tedious, to ensure that the abutments of each pair of drive transmitting abutments were in precisely the correct angular relationship to ensure re-engagement of them all simultaneously with re-setting of the torque limiters on the above described relative rotation between the rotatable members. Of course, if any one of the pairs of abutments were not accurately aligned, then movement of the rotatable members in the direction to reset the torque limiters and re-engage the abutments would be prevented.

Moreover, it is impossible in the clutch of U.s. Pat. No. 2,038,896 to lock the rotatable members in their normal torque transmitting relationship and to re-engage the drive transmitting abutments individually.

To overcome the additional problems encountered in the clutch proposed in U.S. Pat. No. 2,038,896 referred to above we provide in an overload clutch comprising a pair of rotatable members, disengageable drive means to transmit torque between said members, said drive means comprising a plurality of pairs of disengageable drive transmitting abutments and a plurality of torque limiters operative up to a predetermined torque to prevent disengagement of said drive transmitting abutments to enable transmission of torque between said members and operative above said predetermined torque to permit disengagement of said abutments to interrupt transmission of torque between said members, the improvement wherein each torque limiter comprises a pair of clutch elements, one of said elements being connected to one of said abutments by a shaft pivotally mounted by anti-friction bearing means on one of said rotatable members and the other of said clutch elements being non-rotatably mounted on said one rotatable member, said one clutch element being provided for overrunning movement relative to the other when more than a predetermined torque is applied and means preventing such overrunning movement until such torque is exceeded, comprising a plurality of restraining members adapted for rolling movement and maintained in restraining engagement with the torque limiter clutch elements by loading means and wherein torque is transmitted between the rotatable members along a path which includes the abutments, said shaft and anti-friction bearing means whereby said one clutch element does not transmit any torque between the members.

By providing a plurality of torque limiters incorporating rolling restraining members the clutch of the present invention has the following advantages.

Irrespective of the magnitude of the spring pressure there is little or no wear of the overrunning restraining members and the surface with which they are in pressure engagement under the spring loading means. In contrast, in the clutch proposed in the U.S. Pat. No. 2,038,896 the sliding action required for disengagement of the clutch leads to wear of the cam faces and hence to variation in the torque at which the clutch disengages.

By virtue of the foregoing absence of wear, irrespective of the magnitude of the spring loading pressure, an overload clutch according to the invention can effectively transmit torque of the order of 15,000,000 lb.ins. and operate with a high degree of accuracy to disengage the overload torques of the foregoing very high order of magnitude.

Because the restraining members are adapted for rolling movement, as soon as they commence such movement against the spring loading, they will in practice at once ensure a sudden and extremely rapid reduction in the resistance to the one clutch element overrunning the other clutch element. Thus, the torque between the now relatively moving, i.e., relatively disengaging, abutments in each pair of drive transmitting abutments is very rapidly decreased with consequent minimal wear between the relatively moving interengaging abutment surfaces despite the very high torque loading.

In contrast, in the overload clutch proposed in the U.S. Pat. No. 2,038,896, disengagement of the drive transmitting abutments requires a cam action between the surface cams. Thus, there is a relatively large amount of wear of the cam surfaces due to the high pressure under which they are forced together to permit the overload clutch to transmit the relatively high torque under discussion. This is avoided in the clutch of the present invention due to the provision of rolling restraining members. In addition, the inter-engaging drive transmitting abutments are subjected to relatively high pressure because there is no reduction is disengagement torque such as occurs in the present invention, as described hereinbefore, and hence there is relatively high wear of the inter-engaging abutment surfaces of the drive transmitting abutments.

Furthermore, by providing the torque path through the abutments, shaft and anti-friction bearing means to the one rotatable member, whilst no torque is transmitted through the clutch element associated with the shaft, there is therefore no resistance to rotation of the shaft and hence to disengagement of the drive transmitting abutments when the torque exceeds the predetermined value. This is in contrast with the situation obtaining in the overload clutch proposed in the U.S. specification as described hereinbefore.

The provision of anti-friction bearing means between the shaft and the rotatable member which carries the shaft ensures that there is negligable resistance to rotation of the shaft due to torque transmission from the rotatable member to the shaft whilst the arrangement that the clutch element associated with the shaft does not take any part whatsoever in the torque transmital ensures that there is no resistance to disengaging rotation of the shaft from this source.

The restraining means may comprise torque transmitting balls cooperating with appropriately shaped openings in the clutch elements or alternatively may comprise torque transmitting rollers cooperating with appropriately shaped openings or recesses in the clutch elements.

Preferably, the two abutment members comprise one a single gear tooth, the other one a recessed part of a female tooth form e.g., two half gear teeth to receive the single tooth therebetween. Such an arrangement facilitates the engagement and disengagement of the abutments in that they engage and disengage in like manner to the intermeshing between two gear teeth.

Preferably, the restraining members are maintained by the spring loading in operative engagement with the edge portions of openings provided in both clutch elements of each torque limiter, with the restraining members rolling out of engagement of the edge portions of the openings in both elements to displace these relatively, in so doing against spring loading when the designed overload torque is reached, and thus permit of the overrunning movement of one clutch element relative to the other.

Preferably, the torque limiters are arranged in planet fashion around the axis of clutch rotation, with one of the clutch elements of each pair having connected thereto to rotate therewith a tooth-like drive transmitting abutment forming said one of the two abutments in each pair, the other abutment of which is mounted on a common torque output member, for example, as a toothed sun wheel, and having a number of circumferentially spaced pairs of teeth, each pair forming a female tooth form which provides one of the several other abutments and adapted to receive in disengaging relation thereto a tooth-like one abutment therebetween.

In such an arrangement, to reduce the maximum torque loading on each torque limiter one clutch element of a pair of torque limiters may be carried on opposite ends of the shaft carrying said one tooth-like driving abutment.

In order to facilitate still further re-engagement of the clutch, means may be provided for releasably locking the rotatable members together in a ready to re-engage position with the other of the two tooth-like abutments in each pair in a position for torque transmitting engagement with said inoperative abutment when returned toward its operative position and with the torque limiter clutch elements in a ready to re-set position where their associated over-running restraining members are out of engagement with the edge portions of the said openings; the arrangement being such that re-engagement of the clutch is effected by displacing the rotatable elements to said ready to re-engage position, locking the same temporarily in such position, rotating relatively the two clutch elements of each torque limiter into the ready to re-set position and hence returning each one abutment towards its operative position into partial re-engagement with its associated abutment, unlocking the rotatable members and to the now partially re-engaged pairs of drive transmitting abutments transmitting driving torque from a power source to one of the rotatable members to rotate the rotatable members in a direction to effect relative movement between the two drive transmitting abutment members of each pair to return these into their position of full torque driving engagement therebetween and to concurrently effect re-setting of the torque limiters.

In so far as the re-engagement of the clutch is power effected from a power source as opposed to being effected by manual relative rotation of the parts into their required relative position for transmitting the torque load, any risk of danger to the operator is avoided, namely by the feature that the parts are locked in the ready-to-re-engage position, the final re-engagement being under power, as opposed to being manually effected.

Alternatively means may be provided for releasably locking the rotatable members in their normal torque transmitting relationship; the arrangement being such that re-engagement of the clutch is effected by individually and separately rotating relatively the two clutch elements of each torque limiter to reset each torque limiter and simultaneously re-engage each pair of drive transmitting clutches associated with the torque limiter.

BRIEF DESCRIPTION OF THE DRAWINGS

The invention is illustrated in the accompanying drawings wherein:

FIG. 3 is a detailed view partly in section to a larger scale of the same construction.

FIG. 4 is a sectional view of the line 4—4 of FIG. 3.

DESCRIPTION OF THE PREFERRED EMBODIMENT

Figure 1:
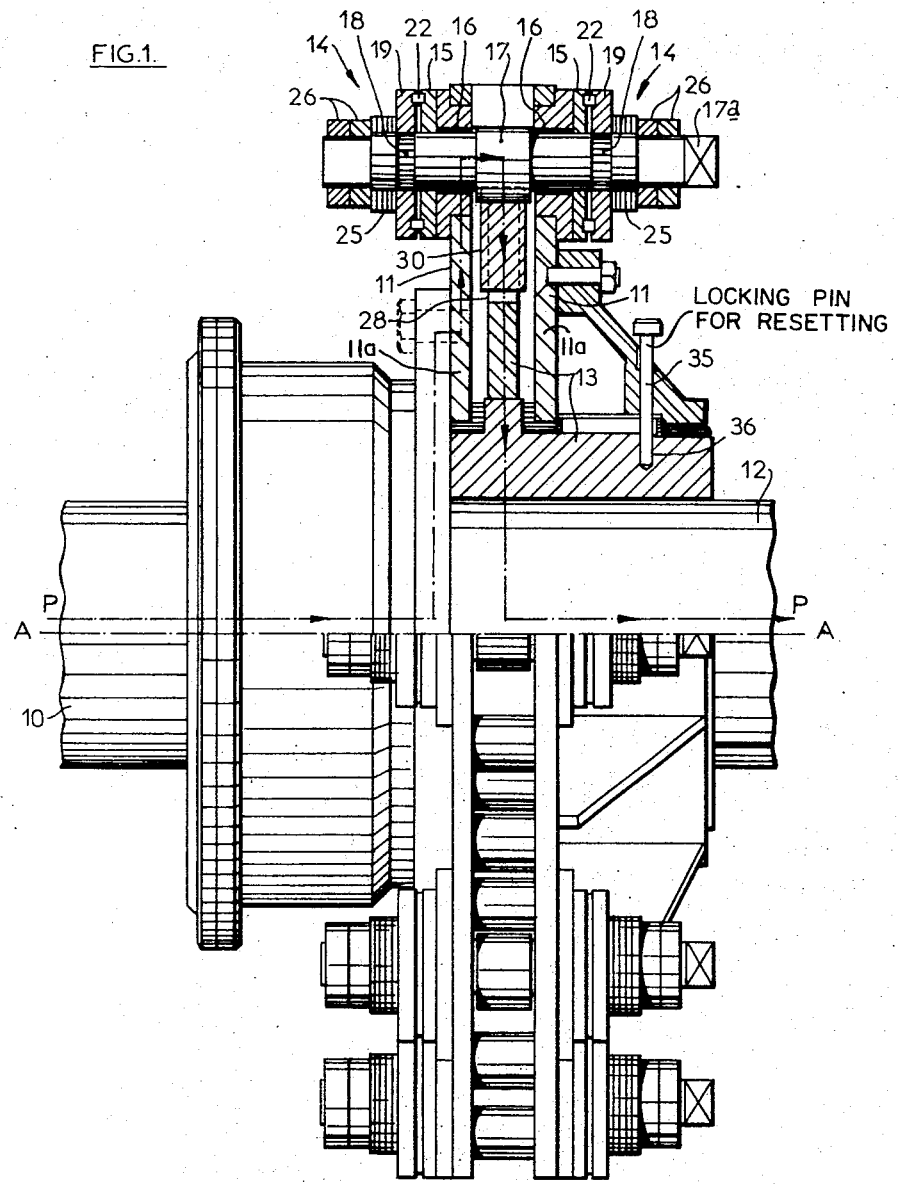
FIG. 1 is a part-sectional side elevation showing a preferred form of overload clutch embodying this invention.
Figure 2:
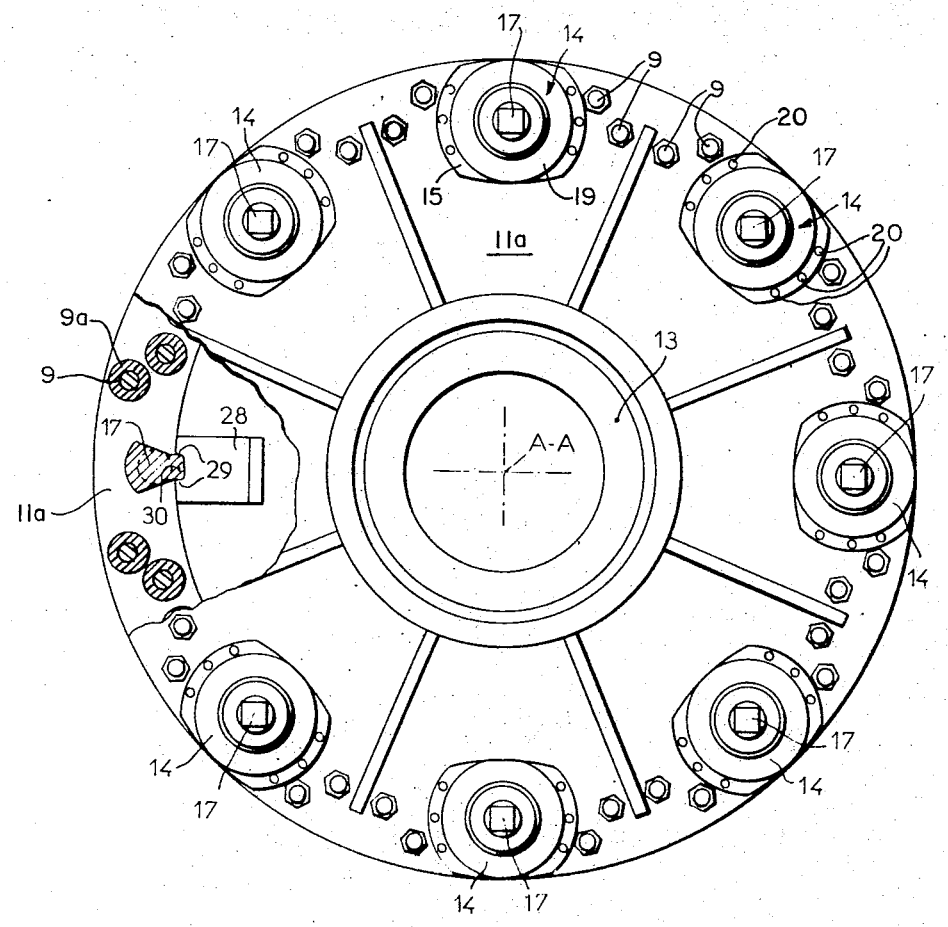
FIG. 2 is an end view with part broken away of the clutch shown in FIG. 1.

Referring now to the drawings there is there depicted an overload clutch comprising an input shaft 10 which is adapted to be connected to a power source, not shown, the shaft having splined or keyed thereto to rotate therewith a driving hub 11, there being aligned with the input shaft 10 an output shaft 12 connected to the apparatus to be driven such as a set of rolls of a hot rolling mill and having mounted thereon a driven hub 13. The power path is depicted by line P-P and its associated arrows the driving hub 11 comprises two elements 11a connected together by bolts 9 and spacers 9a.

Arranged planet fashion around the two shafts 10, 12 and their respective hubs are a number, as shown 8, of pairs of torque limiting devices 14. Each such device comprises a clutch element 15 in the form of an annular disc which is fixed to the hub 11 and a cooperating clutch element 19 also in the form of an annular disc carried on a shaft 17 which is mounted for free rotation relative to the hub 11 by needle or other anti-friction bearings 16. Each element 19 is mounted on the shaft 17 by a splined connection 18.

As shown in FIG. 3, each of the clutch elements 15 is of built-up construction with the portions thereof connected together and to the driving hub 11 by bolts 20, which are received in bushes 20a which are machined on assembly of the overload clutch to ensure that each pair of drive transmitting abutments are correctly mutually positioned to engage with each other.

Thus, each torque limiting device 14 comprises two disc-like clutch elements 15, 19 and between the two elements of each pair is arranged an annular roller carrying cage 21, see FIGS. 3 and 4, formed with a number of through holes in which are housed overrun restraining membets in the form of rollers 22, which, as shown in FIGS. 3 and 4, are supported for rotation about axes which are radial in relation to the axes of shafts 17. As shown in FIG. 4, a single row of these rollers 22 is provided, for example spaced at angular distances of 60°.

The opposed faces of the two clutch elements 15, 19 of each pair are formed with torque transmitting openings 23, 24 respectively, each in the form of shallow recesses of part-circular, V, or U-form having their axes of curvature coincident with the axis of roller rotation when engaged within the recesses as shown in FIG. 3. The arrangement is such that when the clutch elements 15, 19 of each pair are in engagement with one another each of the recesses 23 is in register with a corresponding recess 24. The rollers 22 are maintained in torque transmitting engagement with the recesses 23, 24 by spring loading means comprising a number of conical spring washers 25 carried on end portions of the shafts 17 on which they are located by pairs of spring loading adjusting nuts 26, the spring loading means serving to displace the adjacent clutch element 19 axially along the splined portions 18 of the shaft 17 so as to retain the rollers 22 in torque transmitting engagement with the associated pair of elements 15, 19 until, as described below, each clutch element 19 has applied thereto such a torque that the reaction between part-circular faces of the recesses 23, 24 and the rollers 22 is such as to overcome the force exerted by the spring loading. Under these conditions each element 19 commences to rotate in relation to the associated element 15, i.e., to overrun with the rollers 22 rolling over the end edges 27 of the recesses 23, 24, thus displacing each element axially along the splined part 18 against the loading Consideration of the reaction forces involved between the rollers 22 and the edge portions 27 of the recesses 23, 24 as the rollers commence their rolling disengagement will readily show that the resistance to such disengagement rapidly decreases as soon as the disengaging movement commences despite the increased stressing of the loading spring. Thus, as soon as each element 19 commences to rotate relative to each element 15, i.e., to overrun, the resistance provided by the rollers 22 consequential on the spring loading means, rapidly decreases, i.e., the torque loading exerted by the rollers resisting such overrunning movement falls rapidly as the overrunning movement commences. The significance of this is explained below.

The driven hub 13 has secured thereto a plurality of driven abutments 28, each in the form of two half gear teeth 29, see FIG. 4, there being the same number of driven abutments 28 as there are pairs of torque limiters 14 spaced by the same angular distance around the driven hub 13.

Each driven abutment 28 is adapted for intermeshing drive transmitting engagement with a corresponding driving abutment 30 in the form of a single gear tooth and mounted one on each of the shafts 17 associated with each pair of torque limiters so that in the normal driving position the medial plane of each driving tooth is aligned with the clutch axis A — A and with the two flanks 30a of each tooth 30 in close proximity with the flanks 29a of the corresponding half tooth 29.

These flanks 29a, 30a are each of the usual slightly convex configuration customary in the design of gear teeth so as to provide substantially line engagement between the driving flank of driving abutment 30 and the adjacent flank of the driven abutment 28, a feature which is maintained during the disengagement of the two abutments of each pair of abutments. Thus, for the anti-clockwise direction of rotation about axis A—A indicated by the curving arrow P in FIG. 4, the line of thrust from the driving flank to the driven flank 30a, 29a is that indicated by the arrow LT in FIG. 4.

To facilitate easy re-engagement of each driving abutment 30 with the corresponding driven abutment 28 after overload has occurred, each driven abutment 28 is mounted within a supporting housing 31 for limited sliding movement in a radial direction in relation to axis A—A under control of a spring 32 carried on headed stud 33, the head 34 of which serves to restrict the outward movement of abutment 28.

The described direction of the line of thrust LT is, however, such that with the driving and driven abutments in the fully engaged position depicted in FIG. 4, there is not enough reaction force from the driving abutment on the driven abutment tending to displace this inwardly of its housing 31 out of engagement with the driving abutment.

In assembling the clutch, care is taken to ensure that each of the eight driving abutments are simultaneously in similar drive transmitting engagement with each driven abutment so that the total torque loading derived from the input torque on shaft 10 is shared equally between each of the eight pairs of driving and driven abutments and their associated torque limiters 14.

As earlier stated this input torque loading may be as high as 15,000,000 lb. ins. but by reason of the difference in distance between the driving and driven abutments and their respective axes of rotation, i.e., A—A, and the axis of rotation of each shaft 17, the torque loading on each of the two pairs of torque limiter clutch elements 15, 19 is only 0.50 percent of the foregoing input torque figure.

Thus, where, as in a preferred arrangement for a torque load of 15,000,000 lb.ins., the line of thrust LT is spaced by approximately 2¼ inches from the axis of the adjacent shaft 14, the overrunning torque of each driving element 15 is approximately 70,300 lb.ins. which is a very reasonable and acceptable figure permitting of the overall dimensions of the torque limiters 14 being maintained within reasonably compact limits. Thus, for instance, each disc-like clutch element 15, 19 may have a diameter of approximately 1ft. thus enabling the overall diameter of the clutch to be not greater than 75 inches, which is a reasonable figure as applied to a rolling mill.

In operation the parts are normally in the positions depicted, more particularly in FIGS. 3 and 4 of the drawings, with the driving torque being transmitted from the driving hub 11 and each of the eight driving abutments 30 thereon to each of the driven abutments 28, thus applying to each of the latter a force tending to rotate the associated shaft 17 and clutch elements 19 in relation to the corresponding elements 15, which latter are connected rigidly to the driving hub 11, itself keyed or splined to the driving shaft 10.

This torque tending to rotate the associated shaft 17 is restrained from rotating the shaft 17 by the rollers 22 up to a predetermined torque. Thus, up to the predetermined torque, torque is transmitted from the driving hub 11 through the anti-friction bearing means 16, the shafts 17, driving abutment 30 and driven abutment 28 to the driven hub 13.

As soon as the input torque exceeds the overload value, i.e., 15,000,000 lb.ins. in the example quoted so that the torque loading on each shaft 17 now exceeds twice the approximate figure 70,300 lb.ins. the two clutch elements 19, each carrying this last mentioned torque loading figure, will now in the manner earlier described, commence to overrun the corresponding clutch element 19. Such overrunning movement is permitted by the gear tooth like configuration of the driving and driven abutments 30, 28 allowing the tooth like driving abutment 30 to turn with its shaft 17 about the axis thereof so that the tooth 30 becomes progressively withdrawn from between the two half teeth 29. Such withdrawal movement is greatly facilitated by the fact that as each clutch element 19 commences to overrun its associated clutch element 15, the resistance provided by the rollers 22 against such overrunning movement rapidly falls as earlier described, whereby the pressure exerted by the driving flank 30a on the adjacent tooth flank 29a during such disengaging movement of the respective abutments rapidly falls, thus minimising wear during their relative disengaging movement and allowing the driving abutment rapidly to move into the disengaged position depicted at 30' in FIG. 4 in which it is completely out of engagement with the driven abutment.

The above described relative movement between the abutments upon disengagement thereof constitutes relative movement therebetween along a first path and results from rotation of abutment 30 about the axis of shaft 17 as well as relative rotation between abutments 30 and 28 about axis A—A. Abutment 28 does not move radially while there is mutual relative movement of the abutment in the first path.

Because the only torque transmitting connection between the torque limiters and the hub 11 on which they are carried is through the anti-friction bearing means 16, there is no interference with relative rotation between the clutch elements 19 and 15 and hence no interference with the torque at which the overload clutch interrupts transmission of torque between the input drive 10 and output shaft 12. It is particularly to be noted that the clutch elements 19 do not take any part in the transmission of torque between the hubs 11 and 13 but serve solely to restrain rotation of the shafts 17.

The associated angular rotational movement of the driven abutment and shaft 17 is less than 90°, i.e., each clutch element 19 will be turned through a total angular distance of less than 90° during the above described disengagement of its driving abutment 30 from the driven abutment 28 and the total amount of such angular movement may be approximately 70°.

Because the rollers 22 between each pair of clutch elements 15, 19 are in rolling engagement with the opposed faces of these elements during such overrunning angular movement of the driving element, the rollers with their associated cage 21 will roll through an angular distance of one half of the above value of approximately 70°, i.e., will roll through an angular distance of approximately 35°.

As soon as the driving and driven abutments have disengaged from one another, there will no longer be any force applied to cause relative rotation of the torque limiter clutch elements 15, 19 so that these will remain in the relative angular disengaged position just described, and may be held in such position by the loading of springs 25 acting on the rollers 22.

Thus, if as shown in FIG. 4, the angular spacing of the rollers 22 as well as the angular spacing of each set of torque transmitting openings 23, 24 in their corresponding torque limiter clutch elements 15, 19 is of the order of 60°, it necessarily follows that for such limited relative angular movement of the clutch elements 15, 19 associated with the disengagement of each toothlike driving abutment 30, and due to engagement of the flank 30b of the abutment 30 with the periphery of the rotatable member 13, there is no possibility of any of the rollers 22 being advanced through such an angular distance as to re-engage with the next set of torque transmitting openings 23, 24 in the direction of roller cage rotation.

The overload clutch described above can be reset in one of two alternative ways depending primarily upon the torque to be transmitted by the clutch. In the case of a clutch intended to transmit a relatively high torque it is necessary to reset the torque limiter clutch members mechanically because of the difficulty of manually controlling the energy release when the restraining members fall into their associated openings and this presents a serious problem by reason of the fact that in for instance the particular example described, no less than 16 sets of rollers 22 must be simultaneously reengaged with corresponding sets of torque transmitting openings 23, 24 in each of the 16 pairs of clutch elements 15, 19 so that at the instant of re-engagement, i.e., when all of the rollers simultaneously re-engage with their respective openings 23, 24 there is a most substantial release of loading spring pressure, namely the simultaneous partial release of the loading of all sixteen fullystressed sets of spring washers 25.

The foregoing difficulty is taken care of by providing means for releasably locking the driving hubs 11 to the driven hub 13 in an angular position in which each of the driving abutments 30 of each pair of driving abutments can be partially re-engaged with its associated driven abutment 28 upon rotation of the shaft 17. When the driving abutments 30 are in this partially re-engaged position the rollers 22 of each pair of clutch elements are adjacent to but fully clear of the openings 23, 24 with which they are designed to engage as re-engagement of the clutch is completed.

Such means may comprise the provision of a tapering locking pin 35 which is inserted in a direction normal to the clutch axis A—A, through holes 36 in suitable flanged portions of the two clutch hubs when these are in the relative angular position above described.

The hubs 11 and 13 are moved into this position by effecting relative rotation of the driving and driven clutch hubs by power inducing until these two parts are in position for being locked together by the locking pin 35 above mentioned.

When the hubs 11 and 13 have been so locked together the shafts 17 are manually rotated by engagement of a suitable tool with flats 17a on the shaft 17 to move the driving abutments 30 into the above described partially re-engaged position in which one side flank of each driven abutments 28 is in thrust engagement with one side flank of each driving abutment 30. Thus, each driving abutment is now in a position to effect complete engagement therewith if the hub 11 is power rotated in a direction opposite to the direction of normal power rotation.

The tapered locking pin is now removed and the input shaft 10 power rotated through a small angular distance in a direction opposite to its normal direction of rotation thus bringing the driving and driven abutments back into their fully engaged position as depicted in FIG. 4 so as to reset the torque limiter 14 by rotating each of the spindles 17 by a distance sufficient to effect the required rotational movement of each clutch element 19 and rollers 22 in pressure engagement therewith back into their fully engaged position under the pressure of the spring loading means 25.

The movement of the abutments 28 and 30 from the partially re-engaged position to the fully re-engaged position is permitted by virtue of the radially slidable mounting of the abutment 28 in the support housing 31 since on rotation of the hub 11 in the reverse direction the abutment 28 is permitted to move radially inwardly relative to the abutment 30 and so renders the abutments self-accepting. Hence rotation of the hub 11 is permitted to return all the abutments to the fully engaged position and hence to reset all the torque limiters simultaneously even if one of the shafts 17 has not been rotated to the precise angular position required to achieve re-engagement of the abutments as the above described slidable movement of the abutment 28 ensures that the abutments 28 and 30 accommodate automatically to each other on the above mentioned reverse rotation of the hub 11.

Insofar as such re-engagement with the current simultaneous partial release of the pressure of the spring loading means is power effected, as opposed to being manually effected, the risk of any danger to the operator is avoided.

Alternatively when the overload clutch is to transmit a less high torque it is not necessary to reset the clutch mechanically as the energy release when the restraining members fall into their associated openings can, in this case, be controlled manually.

Thus, in this case the driving hubs 11 are releasably locked to the driven hub 13 in an angular position in which each of the driving abutments 30 can be fully re-engaged with its associated driven abutments 28. In other words the hubs 11 and 13 are releasably locked together in their normal torque transmitting relationship. The locking means may be a tapered locking pin similar to the pin 35 described hereinbefore.

Whilst the hubs 11 and 13 are so locked together each shaft 17 is manually rotated independently, by engagement of a suitable tool with flats 17a on the shaft 17 to move the driving abutments 30 into the above described fully re-engaged position.

The tapered locking pin is then removed and the clutch is ready for use.

If desired, detent means, not shown, may be provided to releasably restrain each driving abutment 30 in its disengaged position.

Although in the example described hereinbefore the second path through which the drive transmitting abutment 28 is movable is a raidal path and the abutment is resiliently biased outwardly of said path it should be appreciated that if desired the, or a part of the, driving tooth 30 could be mounted for movement in a second path for example in a direction also radial to the axis of rotation of the overload clutch and in this case the abutment would be resiliently biased inwardly towards the axis.

Moreover, although spring loading means have been described hereinbefore to urge the clutch elements 15 and 19 together if desired, hydraulic, pneumatic or suitable loading means may be provided.

What I then claim is:

1. In an overload clutch comprising a pair of rotatable members, disengageable drive means to transmit torque between said members, said drive means comprising a plurality of pairs of disengageable drive transmitting abutments and a plurality of torque limiters operative up to a predetermined torque to prevent disengagement of said drive transmitting abutments to enable transmission of torque between said members and operative above said predetermined torque to permit disengagement of said abutments to interrupt transmission of torque between said members, the improvement wherein each torque limiter comprises a pair of clutch elements, means mounting one element of each pair for overrunning movement relative to the other when more than a predetermined torque is applied and means preventing such overrunning movement until such torque is exceeded, comprising a plurality of restraining members adapted for rolling movement and maintained in restraining engagement with the torque limiter clutch elements by loading means and in which the abutments of each pair of drive transmitting abutments are mounted for mutual relative movement in a first path on said overrunning movement to permit disengagement of the abutments and for relative movement in said first path and a second, different path, to permit resetting of the torque limiters and re-engagement of the abutments after overload has occurred.

2. In an overload clutch comprising a pair of rotatable members, disengageable drive means to transmit torque between said members, said drive means comprising a plurality of pairs of disengageable drive transmitting abutments and a plurality of torque limiters operative up to a predetermined torque to prevent disengagement of said drive transmitting abutments to enable transmission of torque between said members and operative above said predetermined torque to permit disengagement of said abutments to interrupt transmission of torque between said members, the improvement wherein each torque limiter comprises a pair of clutch elements, one of said elements being connected to one of said abutments by a shaft pivotally mounted by anti-friction bearing means on one of said rotatable members and the other of said clutch elements being non-rotatably mounted on said one rotatable member, said one clutch element being provided for overrunning movement relative to the other when more than a predetermined torque is applied and means preventing such overrunning movement until such torque is exceeded, comprising a plurality of restraining members adapted for rolling movement and maintained in restraining engagement with the torque limiter clutch elements by loading means and wherein torque is transmitted between the rotatable members along a path which includes the abutments, said shaft and anti-friction bearing means whereby said one clutch element does not transmit any torque between the members.

3. An overload clutch according to claim 1 wherein one of said clutch elements is pivotally mounted on one of said rotatable members in operative relation to the other clutch element which is fixed relative to said rotatable member and one of said abutments being carried by said one rotatable member and being operatively connected to said one clutch element and wherein the co-operating abutment is non-rotatably mounted on the other of said rotatable members.

4. An overload clutch according to claim 1, wherein in that one of said elements is connected to one of said abutments by a shaft pivotally mounted by anti-friction bearing means on one of said rotatable members, and the other of said clutch elements being non-rotatably mounted on said one rotatable member whereby torque is transmitted between the rotatable members along a path which includes that abutments, said shaft and anti-friction bearing means and wherein said one clutch element does not transmit any torque between the members.

5. An overload clutch according to claim 1 wherein the restraining members are maintained by the loading means in operative engagement with edge portions of openings provided in both clutch elements of each torque limiter with the restraining members rolling out of engagement with the edge portions of the openings in both elements to displace the elements relatively in so doing against the loading means when the designed overload torque is reached, and thus to permit of overrunning movement of one clutch element relative to the other.

6. An overload clutch according to claim 2 wherein the restraining members are maintained by the loading means in operative engagement with edge portions of openings provided in both clutch elements of each torque limiter with the restraining members rolling out of engagement with the edge portions of the openings in both elements to displace the elements relatively in so doing against the loading means when the designed overload torque is reached, and thus to permit of overrunning movement of one clutch element relative to the other.

7. An overload clutch according to claim 1 wherein one abutment member comprises a single male gear tooth and the other abutment member a recessed part of female tooth form.

8. An overload clutch according to claim 2 wherein one abutment member comprises a single male gear tooth and the other abutment member a recessed part of female tooth form.

9. An overload clutch according to claim 1 wherein the torque limiters are arranged in planet fashion around the axis of clutch rotation with one of the clutch limiter clutch elements of each pair having connected thereto to rotate therewith a tooth-like drive transmitting abutment forming said one of the two abutments in each pair, the other abutment of which is mounted on a common torque output member having a number of circumferentially spaced pairs of teeth, each pair providing one of the several other abutments and adapted to receive in disengaging relation thereto a tooth-like one abutment there-between.

10. An overload clutch according to claim 2 wherein the torque limiters are arranged in planet fashion around the axis of clutch rotation with one of the clutch limiter clutch elements of each pair having connected thereto to rotate therewith a tooth-like drive transmitting abutment forming said one of the two abutments in each pair, the other abutment of which is mounted on a common torque output member having a number of circumferentially spaced pairs of teeth, each pair providing one of the several other abutments and adapted to receive in disengaging relation thereto a tooth-like one abutment there-between.

11. An overload clutch according to claim 1 wherein means are provided for releasably locking the rotatable members together in a ready to re-engage position in which said drive transmitting abutments are relatively positioned such that they will inter-engage on movement of the torque limiter clutch elements from their disengaged to their engaged position.

12. An overload clutch according to claim 4 wherein means are provided for releasably locking the rotatable members together in a ready to re-engage position in which said drive transmitting abutments are relatively positioned such that they will inter-engage on movement of the torque limiter clutch elements from their disengaged to their engaged position.

13. An overload clutch according to claim 1 wherein means are provided for releasably locking the rotatable members together in their normal torque transmitting relationship in which said torque limiters can be reset individually and separately and said drive transmitting abutments concurrently reengaged.

14. An overload clutch according to claim 4 wherein means are provided for releasably locking the rotatable members together in their normal torque transmitting relationship in which said torque limiters can be reset individually and separately and said drive transmitting abutments concurrently reengaged.

15. An overload clutch according to claim 1 wherein said second path is radial to the axis of rotation of the clutch.

16. An overload clutch according to claim 4 wherein said second path is radial to the axis of rotation of the clutch.

17. An overload clutch according to claim 15 wherein resilient biasing means are provided to restrain movement along said second path in a direction to permit relative movement of the abutments away from each other.

18. An overload clutch according to claim 16 wherein resilient biasing means are provided to restrain movement along said second path in a direction to permit relative movement of the abutments away from each other.

19. An overload clutch according to claim 17 wherein one of said abutments is connected to a torque limiter and is not movable along said second path, and the other abutment, provided on the other of said rotatable members, is mounted for movement along said second path.

20. An overload clutch according to claim 18 wherein one of said abutments is connected to a torque limiter and is not movable along said second path, and the other abutment, provided on the other of said rotatable members, is mounted for movement along said second path.

21. In an overload clutch comprising a pair of rotatable members, disengageable drive means to transmit torque between said members, said drive means comprising a plurality of pairs of disengageable drive transmitting abutments and a plurality of torque limiters operative up to a predetermined torque to prevent disengagement of said drive transmitting abutments to enable transmission of torque between said members and operative above said predetermined torque to permit disengagement of said abutments to interrupt transmission of torque between said members, the improvement wherein each torque limiter comprises a pair of clutch elements, means mounting one element of each pair for overrunning movement relative to the other when more than a predetermined torque is applied and means preventing such overrunning movement until such torque is exceeded and in which the abutments of each pair of drive transmitting abutments are mounted for mutual relative movement in a first path on said overrunning movement to permit disengagement of the abutments and for relative movement in said first path and a second, different path, to permit resetting of the torque limiters and re-engagement of the abutments after overload has occurred.

* * * * *